Dec. 13, 1938.    J. L. DRAKE    2,140,281
APPARARATUS FOR PRODUCING SHEET GLASS
Filed May 24, 1934
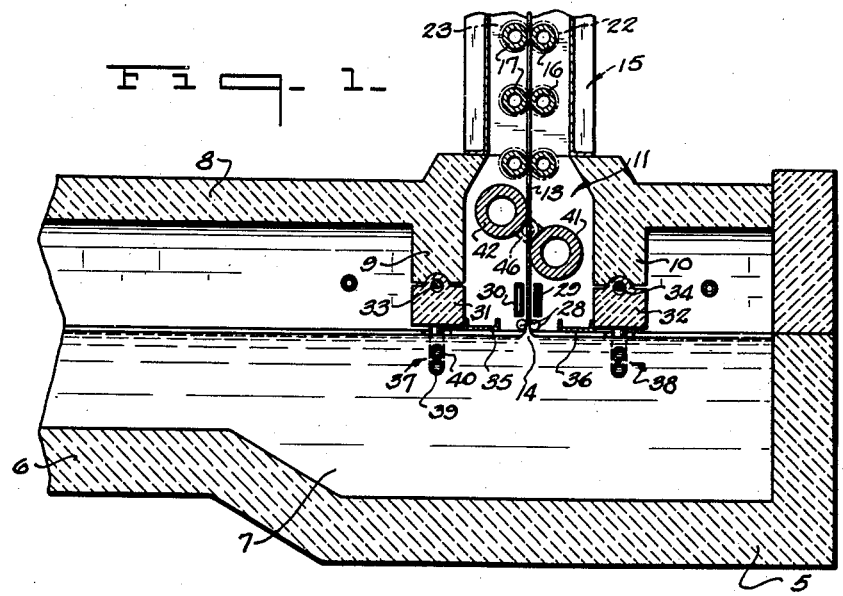
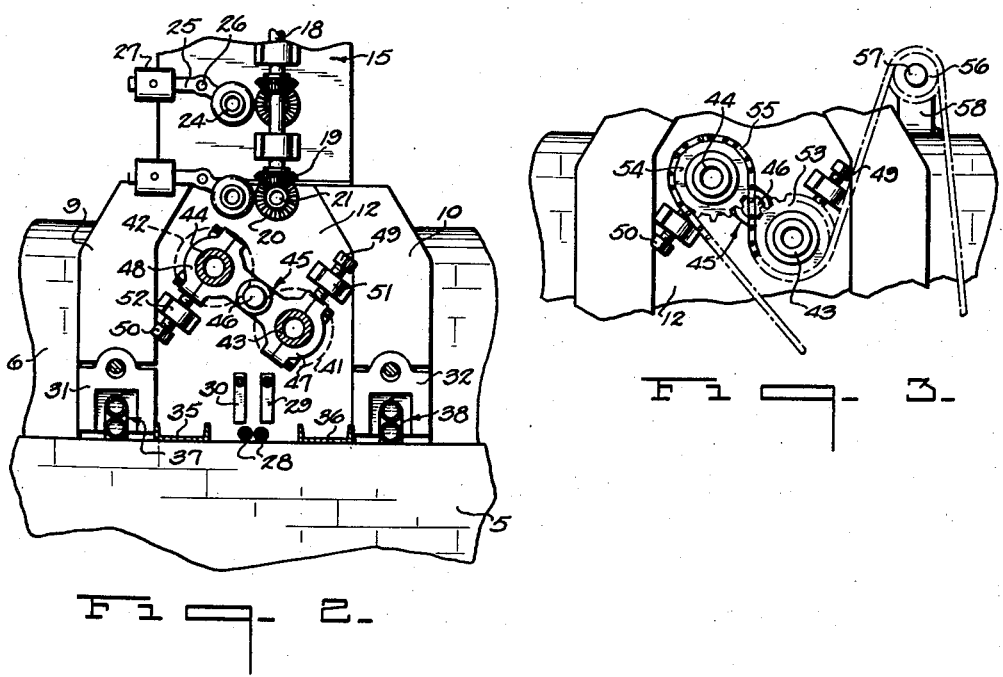
Inventor
JOHN L. DRAKE.
By Frank Fraser
Attorney Patented Dec. 13, 1938

2,140,281

UNITED STATES PATENT OFFICE 2,140,281

APPARATUS FOR PRODUCING SHEET GLASS

John L. Drake, Toledo, Ohio, assignor to Libbey-Owens-Ford Glass Company, Toledo, Ohio, a corporation of Ohio Application May 24, 1934, Serial No. 727,316

6 Claims. (Cl. 49—17)

The present invention relates to improvements in apparatus for producing sheet glass.

While this invention is not limited to use in connection with any particular system of manufacturing sheet glass, it is of utility when associated with a machine for drawing a continuous sheet of glass upwardly from the surface of a molten bath and carrying it vertically through an annealing leer. The principle of the invention may also be applied in the so-called Colburn system for producing sheet glass, wherein the sheet, while still in a semi-plastic condition, is deflected from the vertical into the horizontal plane and passed horizontally through an annealing leer.

An important object of the invention resides in the provision of apparatus whereby the formation of surface defects or irregularities in the sheet being drawn will be reduced to a minimum so that a flatter, smoother and more uniform thickness of sheet may be produced.

Another object of the invention is the provision of apparatus including means engaging the glass sheet while still in a semi-plastic condition to subject the same to a wiping or smoothing action to flatten or iron out any surface irregularities therein.

A further object of the invention resides in the provision of apparatus embodying a pair of movable wiping surfaces, preferably in the form of continuously revolving rolls, positioned to engage opposite surfaces of the sheet to effect such a wiping or smoothing action, said rolls being arranged in different horizontal planes and also serving to anchor the base of the sheet and thereby prevent wavering or movement of the line of generation of the said sheet over the surface of the bath of molten glass from which the sheet is drawn.

Other objects and advantages of the invention will become more apparent during the course of the following description when taken in connection with the accompanying drawing, In the drawing wherein like numerals are employed to designate like parts throughout the same, Fig. 1 is a vertical longitudinal section through sheet glass apparatus embodying the present invention, Fig. 2 is a side elevation thereof, partially in section, and Fig. 3 is a side elevation of a portion of the apparatus showing particularly the means for driving the wiping or smoothing rolls.

Referring now to the drawing, the numeral 5 designates the forward or working end of a glass melting furnace 6 containing a mass of molten glass 7. Extending transversely within the furnace and depending downwardly from the roof 8 thereof are the spaced vertical walls 9 and 10 which define therebetween a drawing chamber 11, said chamber being closed at each end by an end wall 12. That portion of the furnace disposed beneath the drawing chamber 11 is ordinarily termed the drawing or working area or zone, and drawn upwardly from the surface of the glass within said area or zone, at a point intermediate the vertical walls 9 and 10, is the glass sheet 13 connected with the mass of glass 7 by the meniscus 14. The glass sheet, as it leaves the drawing chamber 11, passes upwardly through a vertical annealing leer 15 of the desired height, being carried therethrough between a plurality of pairs of rolls 16 and 17 engaging opposite surfaces of the sheet and which rolls also provide the necessary traction for drawing the sheet upwardly from the molten bath.

One of the leer rolls of each pair, and as here shown the roll 16, is mounted in a relatively fixed position while the roll 17 is movable toward and away from roll 16. The means for mounting and driving these rolls is illustrated in Fig. 2 in which 18 designates a driven vertical countershaft provided with a bevel pinion 19 for each roll 16 meshing with a bevel gear 20 carried at the corresponding end of the shaft 21 of the respective roll. The shaft 21 is provided at its opposite end with a spur gear 22 meshing with a similar gear 23 keyed to the shaft 24 of roll 17 so that the positive rotation of rolls 16 will be transmitted to rolls 17 through the intermeshing gears 22 and 23. The shaft 24 of each leer roll 17 is carried at each end thereof by a bell crank lever 25 pivoted intermediate its ends as at 26 and carrying at its outer end a counterweight 27 which serves to yieldably urge the roll 17 toward the corresponding roll 16. In this manner, the leer rolls 17 are pressed yieldably toward rolls 16 so that breakage of the glass is avoided in case the glass is not perfectly flat and true.

To assist in maintaining the sheet 13 to width, a pair of knurled rollers 28 may be positioned to engage opposite sides of the sheet at each edge thereof, these rollers being ordinarily arranged closely adjacent the meniscus 14. Disposed above the knurled rollers 28 and extending at opposite sides of the sheet 13 are coolers 29 and 30 respectively, each comprising a substantially rectangular metal casing extending transversely of the sheet and being internally cooled by the circulation of a suitable cooling medium, such as water, therethrough.

The side walls 9 and 10 of the drawing chamber 11 terminate above the mass of molten glass 7 and have removably secured to the undersides thereof the two slabs 31 and 32 respectively carried by the rods 33 and 34. These slabs are preferably of a one-piece construction and have the lower surfaces thereof spaced slightly above the surface of the bath of molten glass. These slabs are made of one piece so that the under-surfaces thereof adjacent the molten glass will be unbroken and free from all joints, thereby tending to eliminate what is known in the art as "cold streaks" in the glass passing therebeneath and which would be very apt to occur were the slabs formed of a plurality of blocks arranged side by side. That is to say, the joints or cracks between adjacent blocks would have a tendency to cause "cold streaks" in the glass which would result in the formation of a sheet having thick and thin portions.

Arranged inwardly of the slabs 31 and 32 and suitably carried thereby, if desired, are the horizontal metallic channel members 35 and 36 respectively positioned relatively close to the surface of the mass of molten glass 7 and adapted to reflect heat downwardly thereupon so as to level out the temperature of the surface glass.

Also, if preferred, there can be submerged in the mass of molten glass 7, beneath the vertical walls 9 and 10 of the drawing chamber 11, the two cooling devices or members 37 and 38 respectively, the function of which is to cool and condition the molten glass flowing into the drawing area or zone. Each cooling device comprises a pair of superimposed pipes 39 and 40 extending transversely of the furnace and being arranged in contact with one another and preferably secured together at one or a plurality of points by welding or in some other suitable manner. The pipes 39 and 40 of each cooling device are preferably in communication with one another at one end thereof so that a suitable cooling medium, such as water, can be continuously circulated therethrough.

The greater portion of the glass which is drawn upwardly into the sheet 13 is taken from the surface of the mass of molten glass 7, and the greater portion of the flow of glass through the furnace is a so-called surface flow, the lower strata of glass in the tank having relatively slight movement. In other words, the glass sheet 13 is drawn mainly from the relatively thin surface layer or uppermost strata of glass in the working or drawing zone. The cooling devices 37 and 38, while submerged in the mass of glass 7, are preferably positioned relatively close to the surface thereof. That is to say, the cooling devices are disposed beneath the surface layer or uppermost strata of glass from which the sheet is drawn so that they will serve to both condition and cool this glass as it flows thereover. The cooling devices will serve not only to reduce the temperature of the surface layer of glass to render it suitable for the drawing operation but will, in addition, also tend to eliminate or reduce to a minimum the formation of lines and other defects in the glass.

In accordance with the present invention, there is arranged within the drawing chamber 11, above the sheet coolers 29 and 30, two relatively large rotatable rolls 41 and 42 which are adapted to engage opposite surfaces of the sheet 13 and to have a wiping or smoothing action thereupon to flatten or iron out any irregularities therein. These rolls are adapted to have such a wiping or smoothing action upon the surfaces of the sheet without squeezing the sheet or reducing its thickness. With the general type of machine described above, it has been the customary practice to position the rolls 41 and 42 directly opposite one another, but this arrangement has been found generally unsatisfactory since it is exceedingly difficult, if not impossible, to so adjust the said rolls that they will contact with the sheet across its entire width without squeezing the sheet or effecting an actual reduction in the thickness thereof. This is due to the fact that the glass sheet is not always of an absolutely uniform thickness but, on the other hand, is formed with thick and thin portions. Consequently, if the rolls were arranged sufficiently close together so as to contact with the thin portions of the sheet, they would naturally tend to squeeze between the thicker portions, whereas were they adjusted to just contact with the thicker portions, they would then not contact with the thinner portions of the sheet.

The principal aim and object of this invention, therefore, is to so position the rolls 41 and 42 relative to one another and also relative to the glass sheet being formed that they will be caused to contact with all portions of the sheet without squeezing or effecting any actual reduction in the thickness thereof. To this end, the rolls 41 and 42 are not disposed opposite or in horizontal alignment with one another, but instead are arranged in different horizontal planes as clearly illustrated in the drawings, the roll 41 engaging one surface of the glass sheet being disposed beneath the roll 42 engaging the opposite surface of said sheet. The rolls are also preferably positioned so that the innermost portions of the peripheries thereof will be disposed slightly in the path of travel of the glass sheet, as a result of which they will engage not only the thick portions but likewise the thin portions of the said sheet as it is being drawn. While there may be a slight deflection in the glass sheet from its normal vertical path of travel due to this positioning of the rolls, the amount of deflection will be so slight as to be hardly noticeable. In fact, an object of the invention is to maintain the desired contact between the rolls and the glass sheet with the smallest amount of deflection necessary.

As the glass sheet is drawn upwardly between the rolls 41 and 42, the opposite surfaces thereof will be subjected to a wiping or smoothing action tending to flatten or iron out any surface defects or irregularities which may be present in the sheet and thereby facilitate the production of a flatter and smoother sheet of a more uniform thickness. The rolls 41 and 42 are preferably rotated in the same direction as the travel of the sheet but at a relatively slower speed, although they can of course be driven in the opposite direction if desired. The rolls 41 and 42, while having a wiping or smoothing action upon the glass sheet, will not affect the transparency thereof.

The wiping rolls 41 and 42 are carried by shafts 43 and 44 respectively which are rotatably mounted at each side of the furnace within a supporting member or cradle designated in its entirety by the numeral 45, said supporting member being pivotally mounted intermediate its ends upon a horizontal pin 46 and having formed at its opposite ends the split bearing portions 47 and 48 within which the adjacent ends of the roll shafts 43 and 44 respectively are journaled. The pins 46 are disposed opposite the edges of the glass sheet and define a horizontal axis extending transversely of the sheet in the path of travel thereof and about which the supporting members 45 are adapted to be swung to move the rolls 41 and 42 simultaneously toward or away from the glass sheet.

In order to effect the desired movement of the supporting members 45 and likewise to maintain the rolls in adjusted position, there are associated with each supporting member the two set screws 49 and 50 threaded through stationary blocks 51 and 52 respectively and adapted to engage the split bearing portions 47 and 48. Thus, when it is desired to move the rolls toward or away from the glass sheet, it is simply necessary to effect the proper adjustment of the set screws 49 and 50 to swing the supporting members 45 upon the pivot pins 46 in a clockwise or counterclockwise direction.

The means for driving the rolls 41 and 42 include the two sprocket wheels 53 and 54 keyed to the roll shafts 43 and 44 respectively and about which is trained a sprocket chain 55, said chain being trained about the sprocket wheels in such a manner that the rolls are caused to turn in opposite directions. The sprocket chain can be driven from any suitable source of power and may also be trained about a gear 56 mounted upon shaft 57 carried by a bracket 58 suitably secured to the furnace. As pointed out above, the rolls can be driven either in the same direction as the movement of the sheet or in the opposite direction.

While there has been described hereinabove and illustrated in the drawing the employment of rotatable rolls as the wiping members, yet other types of wiping members may also be used. The essential features of the invention consist in the particular manner of positioning the wiping members relative to one another and also relative to the glass sheet and the means for mounting and adjusting the same.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, means for drawing a sheet of glass upwardly from a mass of molten glass, a pair of members positioned to engage opposite surfaces of the sheet as it is being drawn upwardly and while it is still in a semi-plastic condition, said members being arranged in different horizontal planes and adapted to have a wiping or smoothing action upon the opposite surfaces of said sheet to flatten or iron out any irregularities therein, and means for mounting said members to swing as a unit about a horizontal axis extending transversely of the sheet and in the path of travel thereof whereby to move them simultaneously toward and away from the sheet.

2. In sheet glass apparatus, means for drawing a sheet of glass upwardly from a mass of molten glass, a pair of rotatable members positioned to engage opposite surfaces of the sheet as it is being drawn upwardly and while it is still in a semi-plastic condition, said rotatable members being arranged in different horizontal and vertical planes and adapt to produce a wiping or smoothing action upon the opposite surfaces of said sheet to flatten or iron out any irregularities therein, supporting members disposed at opposite ends of said rotatable members for rotatably supporting the same, and means for pivotally mounting said supporting members to turn about an axis extending transversely of the sheet and in the path of travel thereof whereby to move the rotatable members simultaneously toward or away from said sheet.

3. In sheet glass apparatus, means for drawing a sheet of glass upwardly from a mass of molten glass, a pair of rotatable rolls positioned to engage opposite surfaces of the sheet as it is being drawn upwardly and while it is still in a semi-plastic condition, said rotatable rolls being arranged in different horizontal and vertical planes and adapted to produce a wiping or smoothing action upon the opposite surfaces of said sheet to flatten or iron out any irregularities therein, means for driving said rolls, supporting members disposed at opposite ends of the rolls for rotatably supporting the same, and horizontal pins upon which said supporting members are pivotally mounted intermediate their ends, said pins being disposed opposite the edges of the glass sheet.

4. In sheet glass apparatus, means for drawing a sheet of glass upwardly from a mass of molten glass, a pair of rotatable rolls positioned to engage opposite surfaces of the sheet as it is being drawn upwardly and while it is still in a semi-plastic condition, said rotatable rolls being arranged in different horizontal and vertical planes and adapted to produce a wiping or smoothing action upon the opposite surfaces of said sheet to flatten or iron out any irregularities therein, means for driving the rolls, supporting members disposed at opposite ends of the rolls for rotatably supporting the same, horizontal pins upon which said supporting members are pivotally mounted intermediate their ends, said pins being disposed opposite the edges of the glass sheet, and means for swinging said supporting members upon said pins to move the rolls simultaneously toward and away from said sheet.

5. In sheet glass apparatus, means for drawing a sheet of glass upwardly from a mass of molten glass, a pair of members positioned to engage opposite surfaces of the sheet as it is being drawn upwardly and while it is still in a semi-plastic condition, said members being arranged in different horizontal planes and adapted to have a wiping or smoothing action upon the opposite surfaces of said sheet to flatten or iron out any irregularities therein, and means for pivotally mounting said members for movement toward and away from the sheet.

6. In sheet glass apparatus, means for drawing a sheet of glass upwardly from a mass of molten glass, a pair of rotatable members positioned to engage opposite surfaces of the sheet as it is being drawn upwardly and while it is still in a semi-plastic condition, said rotatable members being arranged in different horizontal and vertical planes and adapted to produce a wiping or smoothing action upon the opposite surfaces of said sheet to flatten or iron out any irregularities therein, supporting members disposed at opposite ends of said rotatable members for rotatably supporting the same, and means for pivotally mounting said supporting members to effect movement of said rotatable members toward or away from said sheet.

JOHN L. DRAKE.